(12) United States Patent
Sun Hsu et al.

(10) Patent No.: US 7,570,560 B2
(45) Date of Patent: *Aug. 4, 2009

(54) SYSTEM AND METHOD FOR LOGICAL SHREDDING OF DATA STORED ON WORM MEDIA

(75) Inventors: Windsor Wee Sun Hsu, San Jose, CA (US); Xiaonan Ma, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 8 days.

This patent is subject to a terminal disclaimer.

(21) Appl. No.: 12/019,247

(22) Filed: Jan. 24, 2008

(65) Prior Publication Data

US 2008/0232593 A1 Sep. 25, 2008

Related U.S. Application Data

(63) Continuation of application No. 10/976,695, filed on Oct. 29, 2004, now Pat. No. 7,376,062.

(51) Int. Cl.
*G11B 7/00* (2006.01)
(52) U.S. Cl. ..................... 369/53.21; 705/57
(58) Field of Classification Search .................. None
See application file for complete search history.

(56) References Cited

U.S. PATENT DOCUMENTS

| 6,473,861 | B1* | 10/2002 | Stokes ........................ 713/193 |
| 7,203,969 | B2* | 4/2007 | Sakurai et al. ................ 726/34 |
| 2003/0072236 | A1* | 4/2003 | Hirotsune et al. ......... 369/53.21 |
| 2005/0018574 | A1* | 1/2005 | Jenkins et al. ............ 369/53.21 |
| 2005/0185547 | A1* | 8/2005 | Nagai et al. .............. 369/47.55 |

\* cited by examiner

*Primary Examiner*—Wayne R Young
*Assistant Examiner*—Adam R Giesy
(74) *Attorney, Agent, or Firm*—John L. Rogitz

(57) ABSTRACT

Files are encrypted and stored on a WORM media device along with their encryption keys, the binary values of which are stored as a combination of written and unwritten sectors in a key storage portion of the media. To shred a file, the associated key is destroyed simply by writing into the unwritten sectors that are associated with the key.

12 Claims, 5 Drawing Sheets

Overall Logic Flow

Direct Mapping-Key sectors

Location-based Encoding Key Sector Pairs

Key replacement

SYSTEM AND METHOD FOR LOGICAL SHREDDING OF DATA STORED ON WORM MEDIA

This is a continuation of U.S. patent application Ser. No. 10/976,695, filed Oct. 29. 2004, now U.S. Pat. No. 7,376,062, from which priority is claimed.

I. FIELD OF THE INVENTION

The present invention relates generally to write once read many (WORM) media.

II. BACKGROUND

Data storage media have been introduced onto which data may be written only once but read many times. Such media is referred to as Write-Once, Read Many, or WORM for short. The advantages of such media are many fold, and include the ability to enhance enforcement of copyrights.

In part because legal rights are involved with WORM media, government regulations have arisen that are related to WORM media. Non-compliance with applicable regulations may incur severe penalty under some of the rules. Notable among current regulations is SEC rule 17a-4, which not only requires data to be reliably stored on "non-erasable" and "non-rewritable" media, but also requires enforcement of data retention policy and data shredding, which, as set forth below, are competing requirements owing to the nature of WORM media.

In greater detail, three types of WORM media exist. The first is so-called physical WORM, or "P-WORM", in which WORM requirements are imposed by the physical characteristics of the media. Among P-WORM media are optical disks. Electronic WORM, or "E-WORM", such as WORM tapes are a second form of WORM, in which WORM requirements are imposed by the electrical characteristics of the media. Yet a third type of WORM is software WORM, or "S-WORM", in which WORM requirements axe imposed through software interlocks.

As critically recognized herein, existing P-WORM and E-WORM systems which, recall, use optical media and magnetic tapes, respectively, are having trouble keeping pace with current performance and capacity requirements for storing regulated data. The S-WORM systems attempt to solve this problem by storing data on rewritable magnetic disks, which have good performance in terms of speed and capacity, and relying on software for WORM safeguards. The disadvantage of S-WORM, however, is that it offers a weaker WORM guarantee than P-WORM or E-WORM.

As further understood by the present invention, regardless of the type of WORM, requirements exist for securely disposing ("shredding") of data on WORM media, e.g., regulations might dictate that sensitive data be completely erased at the end of the documentation retention period. With the relatively weaker S-WORM, shredding can be done relatively easily, by overwriting the data multiple times using selected bit patterns, and sometimes under different temperatures to eliminate off-track remnants of old data. In contrast, with stronger P-WORM and E-WORM systems, data shredding currently must be undertaken by physical destroying the media or by using special hardware to overwrite the data. The present invention understands that such shredding is cumbersome and expensive: not only does it require human intervention (and, when the media is not to be completely destroyed, costly hardware), it is also inefficient because such shredding typically occurs at a much coarser granularity compared with the minimum unit size for writing into the WORM media.

SUMMARY OF THE INVENTION

A general purpose computer is programmed according to the inventive steps herein. The invention can also be embodied as an article of manufacture—a machine component—that is used by a digital processing apparatus and which tangibly embodies a program of instructions that is executable by the digital processing apparatus to execute the present logic. This invention may be realized in a critical machine component that causes a digital processing apparatus to perform the inventive method steps herein.

Accordingly, a write once read many (WORM) data storage device includes a data storage medium that defines data sectors. One or more encrypted files are on the data storage medium. At least one encryption key also is on the data storage medium for decrypting the file. In accordance with present principles, the key is established by a combination of written sectors and unwritten sectors. The key can be shredded by writing data into the unwritten sectors associated with the key.

In some embodiments a key is identified by identifications of the sectors associated with the key. The sectors identified by the identifications may be examined to determine, for each sector, whether it is written, with binary values being returned as the key based thereon.

If the WORM device does not return an error indication when an unwritten sector is read, a special pattern can be written into a sector associated with a key when transforming the sector into the written state. Consequently, unless the special pattern is returned, the sector is considered to be unwritten. In some implementations each bit of a key can be represented by two sectors.

In other embodiments a pair of sectors is used to represent three states, namely, both sectors are unwritten, one of the sectors is written, and both sectors are written. In these embodiments a key can be shredded by writing into unwritten halves of sector pairs. If the device does not provide an indication of whether a sector is already written, a bit in a key can be represented by a triplet of sectors. In either embodiment, keys may be managed using a balanced data tree structure.

In another aspect, a method for rendering at least one file permanently inaccessible on an E-WORM or P-WORM device includes encrypting the file and storing the file on the device. The method also includes, for each sector of at least some sectors in a group of sectors, determining whether the sector is written or unwritten, and based thereon, decrypting the file.

In still another aspect, a WORM device includes means for identifying plural sectors on a storage medium that are associated with a key, and means for decrypting at least one file using a key value based at least in part on a written state of each sector. The written state is either "written" or "unwritten". If desired, means may be provided for shredding a key by writing data into at least one sector having an unwritten state. A sector having a written state indicates a first binary value and a sector having an unwritten state indicates a second binary value.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
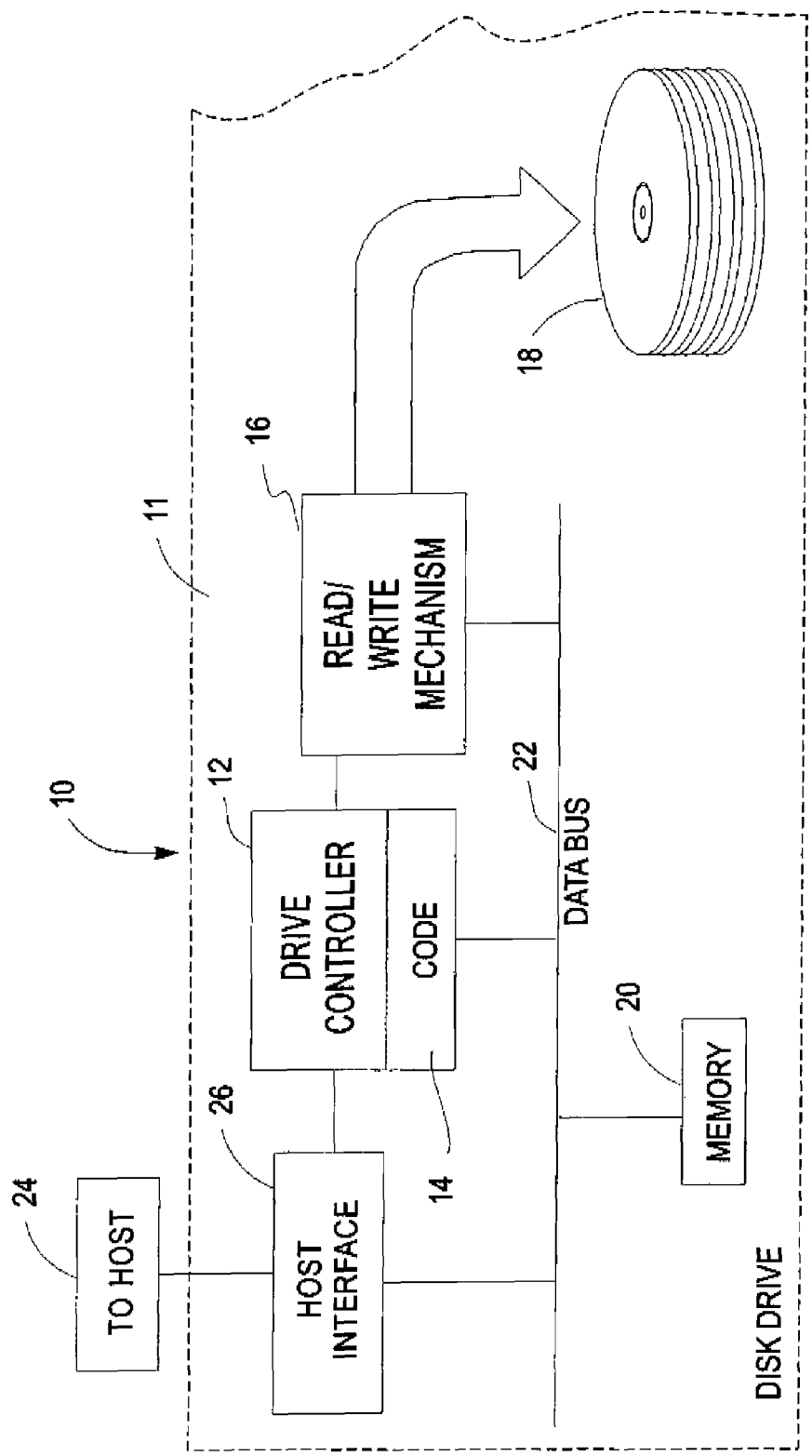
FIG. 1 is a block diagram of an illustrative non-limiting WORM system in which present principles can be used.

Referring initially to FIG. 1, an illustrative non-limiting WORM media device is shown implemented as a disk drive 10, it being understood that present principles apply to P-WORM and E-WORM media including but not limited to optical disks and tapes, as well as to S-WORM media. The non-limiting drive 10 shown in FIG. 1 has a housing 11 holding a disk drive controller 12 that can include and/or be implemented by a microcontrollers. The controller 12 may access electronic data storage in a computer program device or product such as but not limited to a microcode storage 14 that may be implemented by a solid state memory device. The microcode storage 14 can store microcode embodying logic.

The controller 12 controls a read/write mechanism 16 that includes one or more heads for writing data onto one or more disks 18. Non-limiting implementations of the drive 10 include plural heads and plural disks 18, and each head is associated with a respective read element for, among other things, reading data on the disks 18 and a respective write element for writing data onto the disks 18. The disk 18 may include plural data sectors. More generally, as used below, the term "sector" refers to a unit of data that is written to the storage device, which may be a fixed size. The storage device call allow random access to any sector.

If desired, the controller 12 may also communicate with one or more solid state memories 20 such as a Dynamic Random Access Memory (DRAM) device or a flash memory device over an internal bus 22. The controller 12 can also communicate with an external host computer 24 through a host interface module 26 in accordance with principles known in the art.

With respect to the present logic, which may be executed by the host computer 24 or controller 12 accessing the microcode storage 14 or by both processing devices, the flow charts herein illustrate the structure of the present logic as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown.

In other words, the flow charts may be embodied in a computer program that is executed by a processor as a series of computer-executable instructions. These instructions may reside, for example, in a program storage device of the system 10. The program storage device may be RAM, or a magnetic or optical disk or diskette, magnetic tape, electronic read-only memory, or other appropriate data storage device. In an illustrative embodiment of the invention, the computer-executable instructions may be lines of compiled C/C++ compatible code.

Commencing at block 30, files to be stored on the WORM device are encrypted with, e.g., respective encryption keys in accordance with encryption principles known in the art. An encryption key typically has a value that is established by a unique string of binary numbers.

At block 32, the encrypted file or files are stored on the WORM media, e.g., on the disk 18 shown in FIG. 1. Also, at block 34 the encryption key(s) associated with each file are also stored on the WORM media in accordance with present principles. Broadly, an encryption key is stored on the WORM media by establishing a combination of written and unwritten sectors on the media, e.g., in the case of a disk 18, by establishing, potentially in a region of the disk dedicated to key storage, a combination of written and unwritten sectors that, taken together, represent the binary string that is the encryption key. Specifically, a written sector can indicate a first binary value, e.g., a "one", while an unwritten sector can indicate a second binary value, e.g., a "zero".

When it is determined at decision diamond 36, automatically or in response to a user inputting a "delete" command using, e.g., the host computer 24, that it is time to render a file inaccessible (to "shred" the file), the logic flows to block 38, wherein data is written into the unwritten sectors that are associated with the encryption key of the file. In this way, the binary pattern established by the combination of written and unwritten sectors is disrupted, rendering the key effectively destroyed and, hence, rendering the file inaccessible in that the file, without the encryption key, cannot feasibly be decrypted.

The decision diamonds 36 and 40 are used as a convenient way to express other features of the invention, in that in the absence of a delete command or other signal indicating that a file should be made inaccessible and in the presence of a signal requesting access to a file, the logic can flow to block 42 to obtain the necessary key value from the pattern of written and unwritten sectors that is associated with the key, in accordance with principles set forth further below. In general, the logic ascertains which sectors, by sector identifications, are associated with the required key, and then for each sector determines whether it is written or not and, hence, whether each sector (or sector combination, when plural sectors are used for a single bit) represents a "zero" or a "one", thereby establishing a binary string. The key is then used at block 44 to decrypt the file and return the file, now in usable form, the requesting user.

Figure 2:
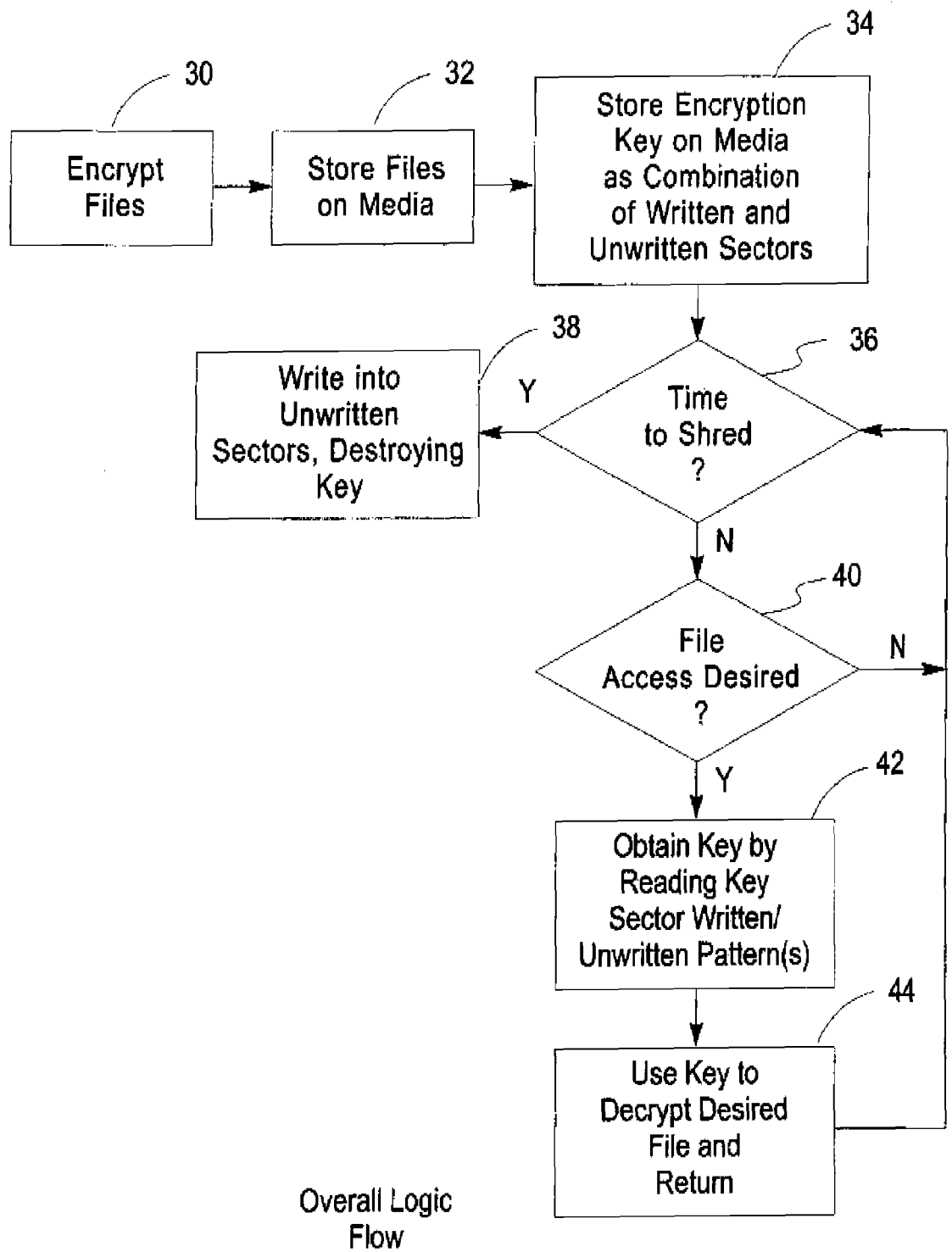
FIG. 2 is a flow chart of the overall logic of the present invention.

Details of exemplary non-limiting implementations of the overall logic shown in FIG. 2 can be seen in the remaining figures. In preferred non-limiting embodiments, it is, as a practical matter, impossible to determine, with reasonable precision, the order in which sectors were written to a WORM device. Otherwise, the state of the WORM device at a particular point of time in the past undesirably can be revealed.

Figure 3:
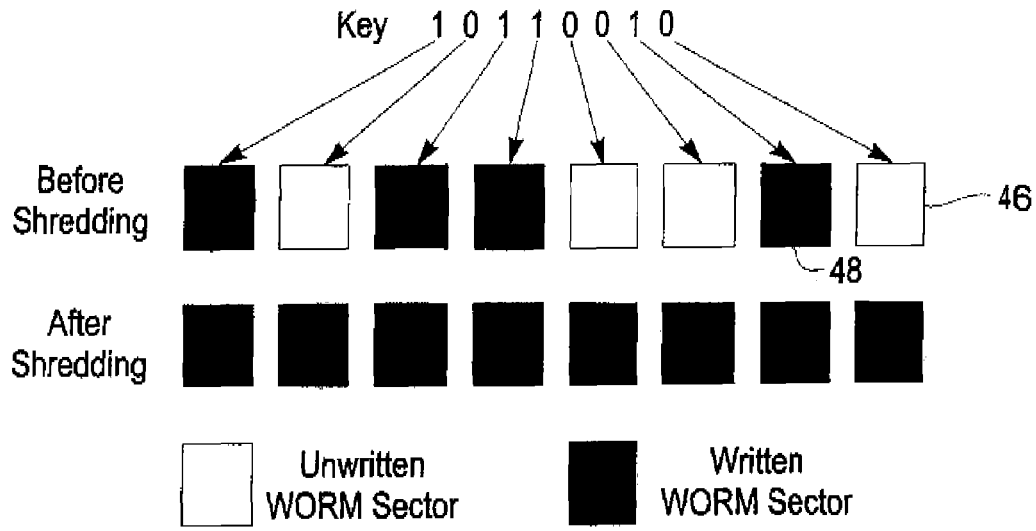
FIG. 3 is a schematic diagram illustrating a first implementation of the present invention, using direct mapping.

FIG. 3 shows one implementation referred to herein as "direct mapping" In FIG. 3, white blocks 46 represent unwritten sectors and darkened blocks 48 represent written sectors, potentially sectors that are in a region of the storage medium that is reserved for key storage. In one embodiment, an unwritten sector 46 represents a binary zero, and a written sector 48 represents a binary one, although this convention can be reversed. The sectors 46, 48 associated with a key may be in physical sequence on the storage medium or may be in logical order. In any case, when access to an encrypted file is required at decision diamond 40 in FIG. 2, the associated key is identified by the sector numbers associated with it, which are recorded when the key is initially stored by writing some sectors and not writing others, perhaps using only the first sector number in a physical or logical sector sequence as appropriate. The identified sectors are then examined to determine their state, i.e., written or not, and the corresponding binary values returned as the key. Thus, in the example shown in FIG. 3, the top ("before shredding") row of blocks represents an encryption key value given by the binary sequence 1, 0, 1, 1, 0, 0, 1, 0. In contrast, the bottom ("after shredding") row of blocks illustrates that when a shredding decision has been made, the results of the step at block 38 produces all written blocks and, hence, a useless binary string of all ones (or zeroes), it being understood, however, that a particular key can be destroyed by writing to only a single unwritten sector if desired.

Accordingly, under the direct mapping method illustrated by FIG. 3, each binary bit of an encryption key is mapped into the written (for one binary value) or unwritten (for the other binary value) status of a WORM sector. Thus, a key of N bits is represented using N sectors, with the stored value of a key being completely determined by which sectors among the N sectors are written in response to the demanded bit values of the key. It is to be understood that the actual content stored in the written sectors does not matter as long as the data written into unwritten sectors to thereby shred a key is generated in the same way as is the data written into the written sectors for establishing "written" sectors in storing the key.

The present invention recognizes that some WORM devices do not return an error indication when an unwritten sector is read (which otherwise indicates to the logic that the sector in fact is unwritten), but instead return some arbitrary data. Under these circumstances, written and unwritten sectors can be distinguished from each other as follows. A special pattern can be written into a sector when transforming it into the written state, so that unless the special pattern is returned when a read is executed pursuant to a file decryption request, the logic considers the sector to be unwritten. However, the present invention recognizes the possibility (however remote) that the same special pattern could be returned when an unwritten sector is read. Accordingly, on the assumption that the data returned on a read of any given unwritten sector does not change over time, each bit may be represented using two sectors. Specifically, a write can be made into one of the two sectors such that the two sectors return different values when read. Subsequently, the second sector can be written such that the two sectors contain the same value. In this way, a binary bit can be represented by whether a pair of sectors return the same ("written") or different ("unwritten") value when read.

Figure 4:
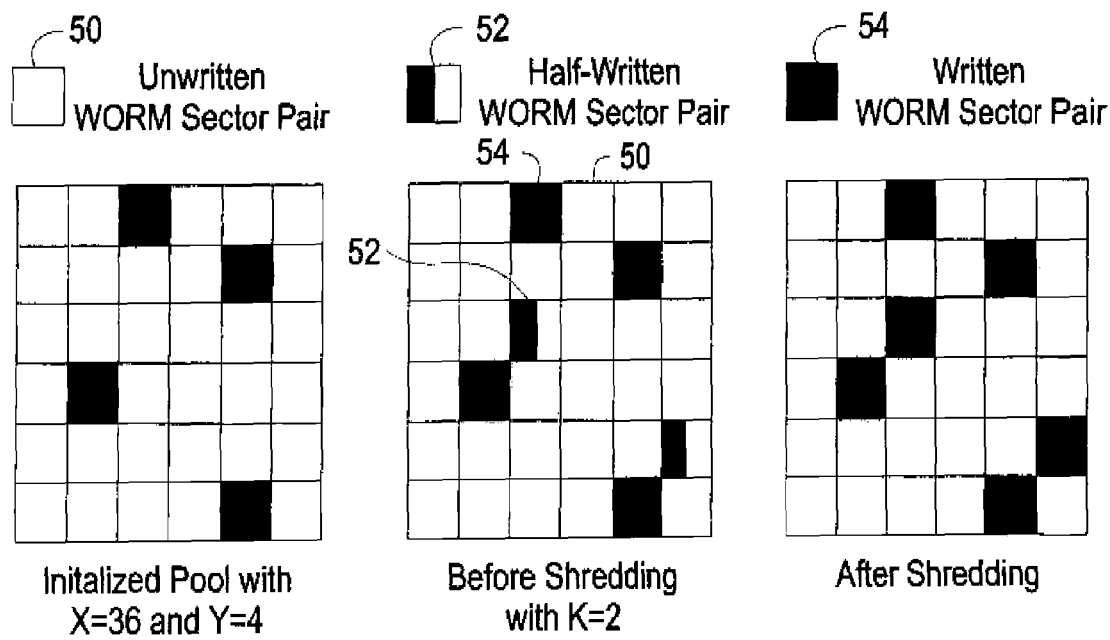
FIG. 4 is a schematic diagram illustrating a second implementation of the present invention, using location-based encoding.

FIG. 4 shows another implementation, referred to herein as "location-based encoding", in which a pair of WORM sectors is used to represent three states: both sectors are unwritten (shown at 50 in FIG. 4), one of the sectors is written (shown at 52), and both sectors are written (shown at 54). One non-limiting convention that can be used is that if both sectors are written, a binary "one" is returned, and if one of two sectors are written, a binary "zero" is returned, with no binary indication being associated with both sectors in the unwritten state.

During initialization, shown in the left hand matrix in FIG. 4, a pool of X pairs of unwritten WORM sectors 50 is allocated, from which Y WORM pairs are randomly selected and rendered into the written state 54. To store a new key (represented in the middle matrix of FIG. 4), K unwritten WORM pairs are randomly selected from the pool and rendered into the half-written state 52 by writing into one of the two sectors of each pair. The key can later be shredded as shown in the right hand matrix of FIG. 4 by converting the K half-written WORM pairs 52 into the written state 54 by writing into the unwritten half of the pair.

The present invention recognizes that given Y, the value of K should be selected so that (Y over K)>$2^N$ so that a key of N bits can be represented using K WORM pairs without sacrificing security. The total number of keys that can be represented in the pool is then $\{X-Y\}/K$.

In the implementation shown in FIG. 4, because the K WORM pairs used to represent a key can only be selected from the unwritten sectors in the pool, it may be difficult to directly encode an arbitrary N-bit key using the location of the K WORM pairs in the pool. Accordingly, the key may be first encoded into K values in such a way so that the original N-bit key can be calculated when and only when all the K encoded values are available. In a simple embodiment, this can be done by generating (K−1) N-bit random values and calculating the remaining one so that the XOR of all the K N-bit values gives the original key. Each N-bit encoded value can then be stored as part of the content written into a WORM pair (a bigger sector size can be used if N is larger than the size of a sector in bits).

If the WORM device does not provide an indication of whether a sector is already written, one more sector can be included into the pair to form a triplet of sectors A, B, C. The three states of a triplet are: A equals neither B nor C (established by writing A with data that is different from the initial value in B and C); A and B are equal to each other and different from C, which can be established by writing a copy of the content in A into B, and A=B=C, which can be established by writing the same content into all three sectors of the triplet. In one non-limiting convention the latter two triplet states can indicate a binary "zero" and a binary "one" respectively.

If a WORM device supports a "sector-append" which allows a sector to be partially written, new data can be appended at the end of the written part of a sector at a finer granularity than the sector size to allow more bits of shreddable information to be encoded in a WORM sector using the length of the data that has been written into the sector. For example, assuming that the size of a sector is 512 bytes and that data can be appended at a granularity of one byte, nine bits of shreddable information can be encoded in a sector by writing into the sector an amount of data equal to the nine bits interpreted as a decimal number. Subsequently, data can be appended to the sector to fill it up so as to remove the data that was encoded. Such a length-based encoding can be integrated with both DM and LE schemes in a straightforward way to further reduce storage overhead.

Another way to greatly reduce the storage overhead is to group files that are likely to be shredded together and encrypt all files within a group using the same shreddable key. In the event that a particular file's retention period must be extended and the file is directly encrypted with a shreddable key shared by all files in a group, then extending the file's retention period requires storing a new copy of the file re-encrypted with a new shreddable key. To avoid re-encrypting the file, instead of encrypting the file directly using the shreddable key, each file can be encrypted with its own key which is not stored in a shreddable format, but is encrypted with the shared shreddable key of the group. In this way, extending a file's retention period only requires storing the file key again, this time encrypted with a new shreddable key. Because file retention periods often are specified in a coarse granularity, e.g., days, it can be advantageous to group files based on their expiration time.

Figure 5:
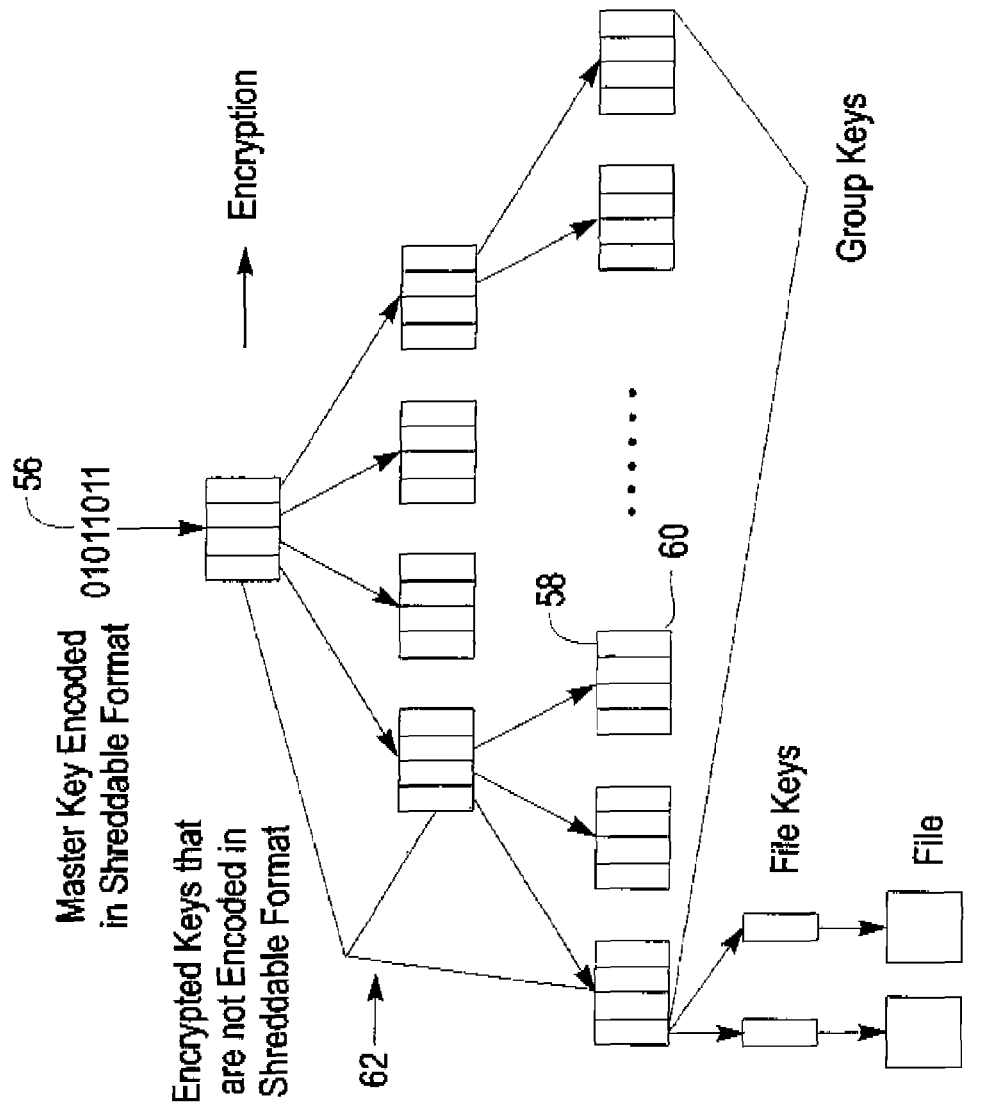
FIG. 5 is a schematic diagram illustrating a key structure for managing keys.

Turning to key management and FIG. 5, for the direct mapping method shown in FIG. 3, one shreddable key 56 may be assigned to each retention group of files. The total number of active shreddable keys maintained in the system is determined by the maximum retention period that can be assigned. Also, one or more non-shreddable keys 58 may be assigned to each retention group, with the keys of all the retention groups establishing the leaf nodes 60 of a balanced tree 62. Each node is encrypted using one key that belongs to its parent node with the root node of the tree 62 encrypted with the shreddable master key. To shred a key stored in one of the leaf nodes, all the keys in that node are first decrypted using the corresponding key from its parent node, then re-encrypted (except for the key to be shredded, e.g., the place of that key can now be filled with a new key or a random value) with a new key which replaces its counterpart in the parent node. The procedure is repeated recursively upwards in the tree until the root node, which is re-encrypted using a new shreddable master key. In this way, shredding a key requires changing $\log_M(N)$ sectors in the tree, where N is the total number of keys and M is the fan-out factor of the tree (i.e., the number of keys each node contains).

In general, keys should be organized into tree structures as shown in FIG. 5 if the key shredding scheme can only store a limited number of keys efficiently at one time, such as the location-based encoding method shown in FIG. 4, or if the requirement for shredding is dynamic, where the actual number of keys that must be shredded cannot be determined in advance. Keys may be managed using a balanced tree if files are grouped according to retention period expiration times. Or, keys can form a tree structure according to file system name space hierarchy with the expectation that files close to each other in the name space may be likely to be shredded together.

After a system crash or reboot, the shreddable keys can normally be discovered by scanning the area on the WORM media where the keys are stored for both schemes. Since storing a shreddable key normally requires multiple IOs to the WORM media, the system might crash in the middle of writing a key. For the direct mapping approach of FIG. 3 7 to determine whether a key has been written completely, an otherwise difficult task given that a half-written key cannot be distinguished from a complete key which happens to contain the same number of unwritten sectors at the end, a sentinel sector can be written to after the key is written. Thus, a half-written key can be detected by determining whether its sentinel sector is written.

Figure 6:
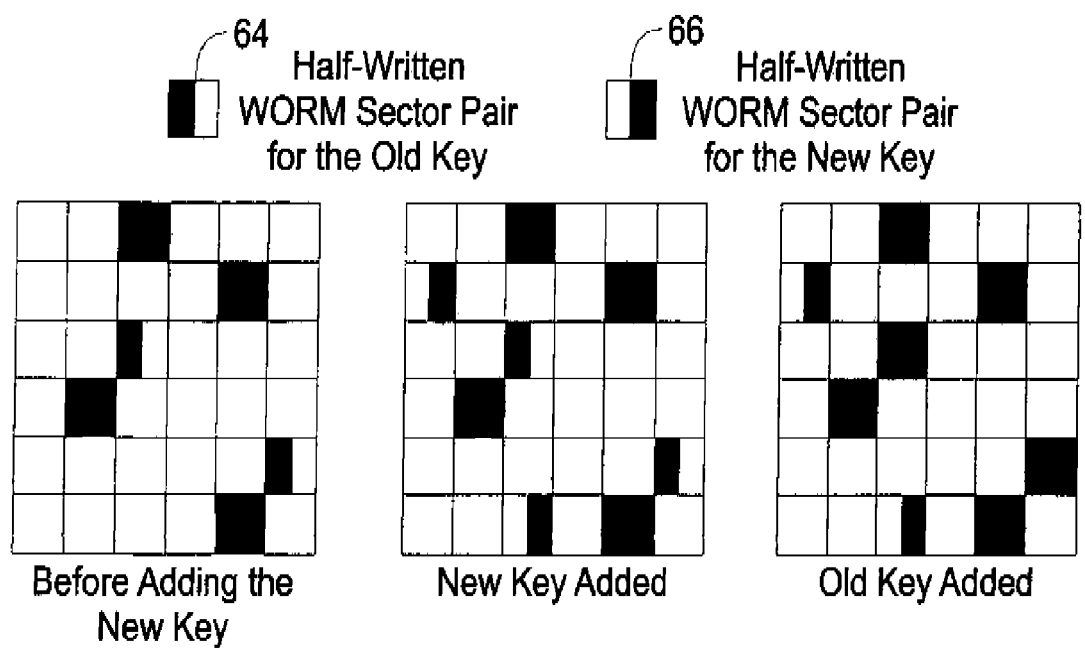
FIG. 6 is a schematic diagram illustrating key replacement in the location-based encoding implementation shown in FIG. 4.

On the other hand, for the location-based encoding method shown in FIG. 4 in the event of a crash or re-boot and now referring to FIG. 6, detecting whether a key has been completely written can be done without additional information because each key uses a fixed number of WORM pairs. However, the LE scheme can only hold one shreddable key at a time. Accordingly, it may be required to first write a new key before the previous key is erased which means a failure in the middle of writing a new key may leave many half-written WORM pairs on the disk. To solve this problem, the LE method of FIG. 4 can be modified under the recognition that each WORM pair can actually represent four distinguish states: (unwritten, unwritten), (written, unwritten, indicated at 64), (unwritten, written, indicated at 66), and (written, written). The LE scheme discussed previously only requires three states, so that the previous key can be represented with WORM pairs using one of the two middle states as shown in the left matrix of FIG. 6 and the new key can be represented with WORM pairs using the other middle state as shown in the center matrix. This allows the system to distinguish between WORM pairs used for different keys without extra storage overhead. The old key may then be shredded by writing into the unwritten halves as shown in the right matrix of FIG. 6.

In addition, if desired to improve reliability, erasure coding can be combined with the key shredding schemes mentioned previously. With erasure coding, each key is divided into M segments and then encoded into N segments with the guarantee that the key can be recovered if any M segments are available.

Also, data verification support can be easily added in the proposed logical shredding scheme. In a preferred embodiment, a key can be generated using a secure hash calculated based on the data that the key will be used to encrypt. This allows the data integrity to be verified during decryption.

To render it difficult to ascertain the order in which sectors have been written, sectors of a key can be written on different tracks of the disk and waiting a brief period between the writing of each sector.

While the particular SYSTEM AND METHOD FOR LOGICAL SHREDDING OF DATA STORED ON WORM MEDIA as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A write once read many (WORM) data storage device, comprising:
   at least one data storage medium defining data sectors, each sector including plural bytes;
   at least one encrypted file on the data storage medium; and
   at least one encryption key on the data storage medium for decrypting the file, the key being established at least in part by a combination of written sectors and unwritten sectors, the key being shreddable by writing data into at least some of the unwritten sectors associated with the key.

2. The device of claim 1, wherein a key is identified by identifications of the sectors associated with the key.

3. The device of claim 2, wherein the sectors identified by the identifications are examined to determine, for each sector, whether it is written, binary values being returned as the key based thereon.

4. The device of claim 1, wherein the device does not return an error indication when an unwritten sector is reads and a special pattern is written into a sector associated with a key when transforming the sector into the written state, so that unless the special pattern is returned, the sector is considered to be unwritten.

5. The device of claim 4, wherein each bit of a key is represented by two sectors.

6. The device of claim 1, wherein a pair of sectors is used to represent three states: both sectors are unwritten, one of the sectors is written, and both sectors are written.

7. The device of claim 6, wherein a key is shredded by writing into unwritten halves of sector pairs.

8. The device of claim 7, wherein the device does not provide an indication of whether a sector is already written, and a bit in a key is represented by a triplet of sectors.

9. The device of claim 1, wherein keys are managed using a balanced data tree structure.

10. A write once read many (WORM) device comprising:
means for identifying plural sectors on a storage medium that are associated with a key, each sector being defined by more than one byte; and
means for decrypting at least one file using a key value based at least in part on a written state of each sector identified by the means for identifying, the written state being written or unwritten.

11. The device of claim 10, comprising means for shredding a key by writing data into at least one sector having an unwritten state.

12. The device of claim 11, wherein a sector having a written state indicates a first binary value and a sector having an unwritten state indicates a second binary value.

* * * * *